United States Patent
Cox et al.

(10) Patent No.: US 8,327,497 B2
(45) Date of Patent: Dec. 11, 2012

(54) WINDOW WIPER WITH HIGH PARK POSITION

(75) Inventors: Thomas W. Cox, Lapeer, MI (US);
Mark K. Denison, Macomb, MI (US);
Marcia R. Ganske, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 12/862,853

(22) Filed: Aug. 25, 2010

(65) Prior Publication Data

US 2012/0047672 A1    Mar. 1, 2012

(51) Int. Cl.
*B60S 1/02*     (2006.01)
*H02P 3/08*     (2006.01)

(52) U.S. Cl. ............... 15/250.17; 318/467; 318/DIG. 2; 15/250.12

(58) Field of Classification Search ............ 15/250; 700/275; 318/471
See application file for complete search history.

(56) References Cited

U.S. PATENT DOCUMENTS

| | | | | |
|---|---|---|---|---|
| 3,699,605 | A * | 10/1972 | Bellware | 15/250.17 |
| 3,705,520 | A * | 12/1972 | Carpenter | 74/600 |
| 4,559,484 | A * | 12/1985 | Hirano | 318/443 |
| 4,700,026 | A * | 10/1987 | Kamiyama et al. | 200/19.07 |
| 4,866,359 | A * | 9/1989 | Schmid et al. | 318/471 |
| 6,351,088 | B1 * | 2/2002 | Lombardo et al. | 318/9 |
| 7,777,993 | B2 * | 8/2010 | Sakamoto | 361/33 |
| 2006/0284584 | A1 * | 12/2006 | Hawighorst et al. | 318/445 |

* cited by examiner

*Primary Examiner* — Gary Graham
*Assistant Examiner* — Marc Carlson

(57) ABSTRACT

A method of operating a wiper system on a window of a vehicle. The method comprising: setting a park position for a wiper to one of a standard park position or a high park position, where the standard park position locates a wiper blade of the wiper closer to a bottom edge of the window; activating the wiper system to cause the wiper to be pivoted back and forth between an in-wipe position and an out-wipe position; deactivating the wiper system; if the park position is set to the standard park position when the wiper system is deactivated, stopping movement of the wiper when the wiper blade is in the standard park position; and if the park position is set to the high park position when the wiper system is deactivated, stopping movement of the wiper when the wiper blade is in the high park position.

8 Claims, 1 Drawing Sheet

WINDOW WIPER WITH HIGH PARK POSITION

BACKGROUND OF INVENTION

The present invention relates generally to wipers for wiping windows in vehicles, and more particularly to such wipers having a selectable high park position.

Conventional windshield wiper systems move the windshield wipers back and forth between an out-wipe position (farthest position out on the windshield) to an in-wipe position (lowest position on the windshield). The in-wipe and out-wipe positions are spaced apart to generally maximize the coverage of the wiper blades on the windshield. Also, the in-wipe position is where the windshield wiper stops (the park position) when the windshield wipers are turned off. Thus, the windshield wiper in-wipe position is placed as low as practicable on the windshield to minimize wind noise and improve driver visibility.

During winter months, the windshield wiper blades can have snow and ice build-up, which can lead to poor wipe quality on the windshield. It is desirable to minimize the potential for snow and ice build-up on the wiper blades.

SUMMARY OF INVENTION

An embodiment contemplates a method of operating a wiper system on a window of a vehicle, the method comprising the steps of: setting a park position for a wiper to one of a standard park position or a high park position, where the standard park position locates a wiper blade of the wiper closer to a bottom edge of the window than the high park position; activating the wiper system to cause the wiper to be pivoted back and forth between an in-wipe position and an out-wipe position; deactivating the wiper system; if the park position is set to the standard park position when the wiper system is deactivated, stopping movement of the wiper when the wiper blade is in the standard park position; and if the park position is set to the high park position when the wiper system is deactivated, stopping movement of the wiper when the wiper blade is in the high park position.

An embodiment contemplates a wiper system for use on a window of a vehicle. The wiper system may comprise a wiper, a wiper arm pivot, a wiper drive motor, a controller and a switch. The wiper may include a wiper arm and a wiper blade mounted to the arm, with the wiper blade in contact with the window. The wiper arm pivot pivotally secures the wiper arm relative to the window. The wiper drive motor pivots the wiper arm between an out-wipe position and an in-wipe position. The controller is in communication with and controls operation of the wiper drive motor, the controller controlling the motor to cause the motor to selectively stop the wiper blade in a standard park position when in a standard park mode and in a high park position when in a high park mode, with the high park position locating the wiper blade farther from a bottom edge of the window than the standard park position. The switch is in communication with the controller and causes the controller to toggle between the standard park mode and the high park mode.

An advantage of an embodiment is that, by allowing for an alternative high park position, the potential for snow and ice build-up on the windshield wiper blades is reduced during winter driving conditions, while not adding to the cost of the windshield wiper system. The high park position maintains the windshield wipers more removed from where snow begins to build up between the hood and windshield and may locate the windshield wiper blades on a part of the windshield better covered by the vehicle's defrost vents. This reduction in snow and ice build-up may improve wipe quality, which may improve visibility through the windshield. Moreover, the entire wipe pattern from a low in-wipe position to an out-wipe position is still covered during wiper operation, and the wipers can be parked at the lower in-wipe position when ice and snow build-up is not a concern.

DETAILED DESCRIPTION

Figure 1:
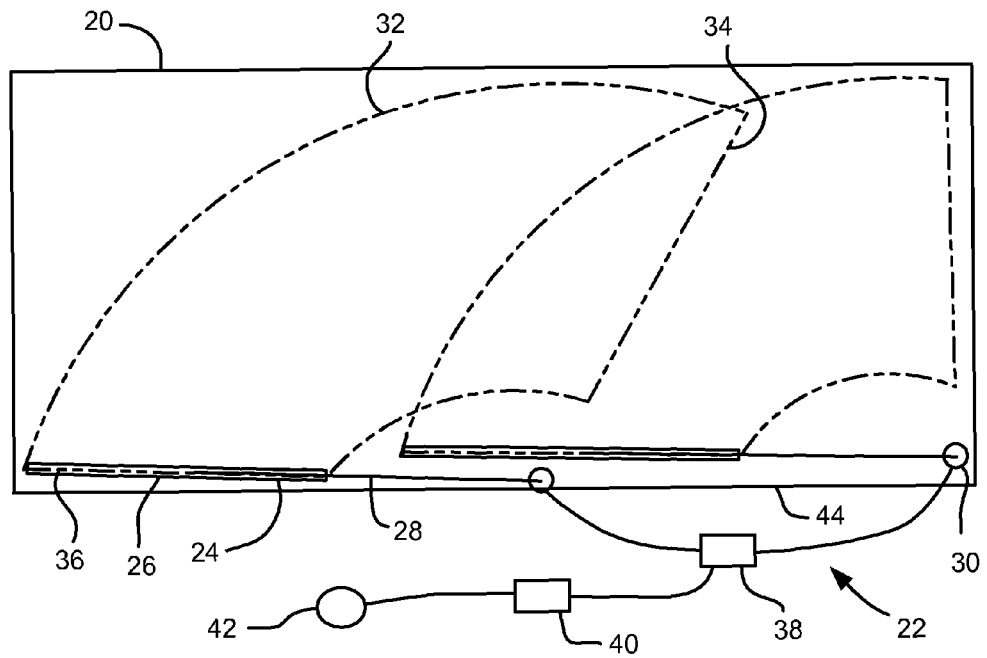
FIG. 1 is a schematic view of a vehicle windshield and windshield wiper system, with the windshield wipers shown in a standard park position.
Figure 2:
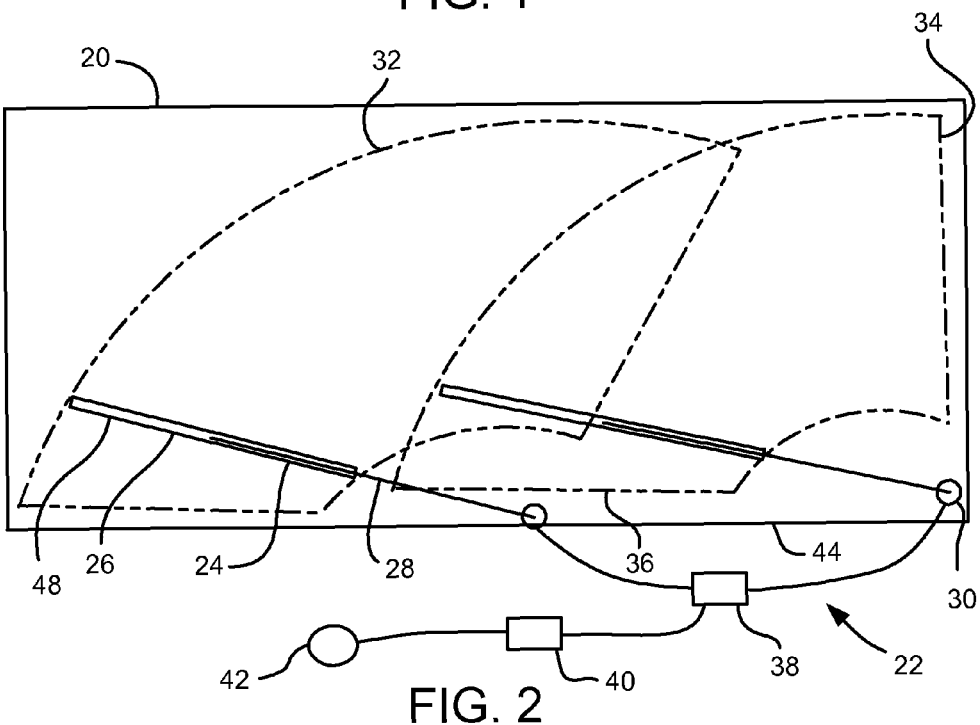
FIG. 2 is a schematic view of the vehicle windshield and wiper system, with the windshield wipers shown in a high park position.

FIGS. 1 and 2 show a vehicle windshield 20 and a tandem front wiper system 22. The wiper system 22 includes a pair of windshield wipers 24, each having wiper blades 26 mounted on wiper arms 28. The wiper arms each mount to wiper arm pivots 30 about which the windshield wipers 24 rotate. While a pair of windshield wipers 24 are shown in a tandem arrangement, the wiper system 22 may have just one larger windshield wiper configured to wipe the entire windshield, if so desired.

The wiper blades 26 contact the glass and each pivots back and forth over a glass coverage area 32 (shown with phantom lines), which is an area where the blades 26 contact the windshield 20. The wiper blades 26 pivot clockwise (as seen in the figures) up to an out-wipe position 34, which is the maximum location of coverage in the clockwise direction. The wiper blades 26 pivot counterclockwise (as seen in the figures) down to an in-wipe position 36, which is the maximum location of coverage in the counterclockwise direction and is also the standard park position. The windshield wipers 24 are shown in FIG. 1 in the standard park position, which is near the bottom edge 44 of the windshield.

The wiper system 22 also includes a wiper drive motor 38 that drives the windshield wipers 24 back and forth across the windshield 20. The wiper drive motor 38 is controlled by a controller 40, which may be, for example, the vehicle's body control module. A driver operable switch 42 is in communication with the controller 40 and can be manipulated by the vehicle driver to indicate the desired wiper function, as well as turn on and off the wipers. The switch 42 relays the switch position/function to the controller 40, which then controls the timing and function of the wiper operation. For example, when the wipers are operating and the driver turns the switch 42 to the off position, the controller 40 will then determine when to cease motor operation so that the wipers 24 stop in the desired park position.

The operation of the front wiper system 22 will now be discussed. While the windshield wipers 24 are operating, the drive motor 38 is employed to move the windshield wipers 24 back and forth between the out-wipe position 34 and the in-wipe position 36. When the windshield wipers 24 are no longer needed, the driver turns them off.

Under driving conditions where the chance of snow and ice build-up is minimal, the driver can set the switch 42 to park the windshield wipers 24 in the standard park position (shown in FIG. 1) when the windshield wipers are turned off. In this position, the wipers 24 are positioned close to the bottom edge 44 of the windshield 20, farther from the driver's view. The controller 40 may accomplish this positioning by determining the position of the wipers 24 and then ceasing operation of the drive motor 38 at the appropriate time for the wiper motion to stop when the wipers 24 are at the in-wipe position 36 (the standard park position). The controller 40 may determine the position, for example, by receiving a signal from the drive motor 38 as it is operating.

Under driving conditions where the chance of snow and ice build-up is considered likely, the driver can set the switch 42 to park the windshield wipers 24 in the high park position 48 (shown in FIG. 2) when the windshield wipers are turned off. In this position, the wipers 24 are farther from the bottom edge 44, where snow and ice is likely to build-up. Again, the controller 40 may accomplish this positioning by determining the position of the wipers 24 and changing the timing of ceasing operation of the drive motor 38 to cause the wiper motion to stop when the wipers 24 are in the high park position 48. This may be accomplished by stopping the wipers 24 just after they leave the in-wipe position 36 or may be accomplished by stopping the wipers 24 as they move from the out-wipe position 34, but before they reach the in-wipe position 36.

The switch 42 may be a separate two position switch with one position setting the wiper system 22 to the standard park position and the other position setting the wiper system 22 to the high park position 48. Alternatively, the switch 42 may employ one of the current switches used for wiper control in order to toggle between the two modes of park position. For example, in a vehicle that employs a multi-function stalk switch (not shown) to control wiper operations, the rotating switch that has positions such as mist, off, intermittent wipe, low speed and high speed, may be employed. The mist function may be a switch position that causes a one time instantaneous wipe. The controller 40 may be programmed so that, when the driver holds the switch 42 in the mist position for at least ten seconds (or some other predetermined amount of time), the controller will toggle from the current park position to the other. Again holding the switch 42 in the mist position for at least ten seconds will cause the controller 40 to toggle back to the first park position setting. In this way, no additional hardware for a switch is required to add this functionality to a particular model of vehicle, saving cost and complexity.

While certain embodiments of the present invention have been described in detail, those familiar with the art to which this invention relates will recognize various alternative designs and embodiments for practicing the invention as defined by the following claims.

What is claimed is:

1. A method of operating a wiper system on a window of a vehicle, the method comprising the steps of:
    (a) setting a park position for a wiper to one of a standard park position or a high park position, where the standard park position locates a wiper blade of the wiper closer to a bottom edge of the window than the high park position, and wherein the wiper system includes a mist switch and step (a) is further defined by pressing and holding the mist switch for a predetermined extended period of time to toggle between the standard park position and the high park position;
    (b) activating the wiper system to cause the wiper to be pivoted back and forth between an in-wipe position and an out-wipe position on the window;
    (c) deactivating the wiper system;
    (d) if the park position is set to the standard park position when the wiper system is deactivated, stopping movement of the wiper when the wiper blade is in the standard park position; and
    (e) if the park position is set to the high park position when the wiper system is deactivated, stopping movement of the wiper when the wiper blade is in the high park position.

2. The method of claim 1 wherein step (a) is further defined by the standard park position being at a same wiper location as the in-wipe position.

3. The method of claim 1 wherein steps (d) and (e) are further defined by a controller determining a current position of the wiper by detecting signals from a wiper drive motor.

4. The method of claim 1 wherein the window is a windshield and the step (b) is further defined by the wiper being pivoted back and forth between an in-wipe position and an out-wipe position on the windshield.

5. The method of claim 1 wherein the wiper system includes a second wiper and the method further comprises:
    (f) activating the wiper system to cause the second wiper to be pivoted back and forth between an in-wipe position and an out-wipe position on the window;
    (g) if the park position is set to the standard park position when the wiper system is deactivated, stopping movement of the second wiper when a second wiper blade is in the standard park position; and
    (h) if the park position is set to the high park position when the wiper system is deactivated, stopping movement of the second wiper when the second wiper blade is in the high park position.

6. A wiper system for use on a window of a vehicle comprising:
    a wiper including a wiper arm and a wiper blade mounted to the wiper arm, the wiper blade in contact with the window;
    a wiper arm pivot pivotally securing the wiper arm relative to the window;
    a wiper drive motor configured to pivot the wiper arm between an out-wipe position and an in-wipe position;
    a controller in communication with and controlling operation of the wiper drive motor, the controller configured to control the wiper drive motor to cause the wiper drive motor to selectively stop the wiper blade in a standard park position when in a standard park mode and in a high park position when in a high park mode, the high park position locating the wiper blade farther from a bottom edge of the window than the standard park position; and
    a switch in communication with the controller, the switch configured to cause the controller to toggle between the standard park mode and the high park mode when actuated; and wherein the switch is also configured to communicate with the controller to provide a mist function on the window.

7. The wiper system of claim 6 including a second wiper having a second wiper arm and a second wiper blade mounted to the second wiper arm, the second wiper blade in contact with the window;
    a second wiper arm pivot pivotally securing the second wiper arm relative to the window, the wiper drive motor configured to pivot the second wiper arm between an out-wipe position and an in-wipe position.

8. The wiper system of claim 6 wherein the window is a windshield and the wiper is a windshield wiper.

\* \* \* \* \*